US012574357B2

(12) United States Patent
Cheng et al.

(10) Patent No.: US 12,574,357 B2
(45) Date of Patent: *Mar. 10, 2026

(54) SECURE DATA EXCHANGE USING FORMAT-PRESERVING ENCRYPTION

(71) Applicant: Capital One Services, LLC, McLean, VA (US)

(72) Inventors: Hao Cheng, Oakton, VA (US); Rohit Joshi, Glen Allen, VA (US); Ashish Gupta, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 158 days.

This patent is subject to a terminal disclaimer.

(21) Appl. No.: 18/643,537

(22) Filed: Apr. 23, 2024

(65) Prior Publication Data

US 2026/0006006 A1 Jan. 1, 2026

Related U.S. Application Data

(63) Continuation of application No. 17/661,773, filed on May 3, 2022, now Pat. No. 12,021,847.

(51) Int. Cl.
 H04L 9/40 (2022.01)
 H04L 9/08 (2006.01)
(52) U.S. Cl.
 CPC ........ H04L 63/0428 (2013.01); H04L 9/0866 (2013.01); H04L 9/0872 (2013.01); *H04L 2209/34* (2013.01)
(58) Field of Classification Search
 CPC .. H04L 9/0866; H04L 9/0872; H04L 2209/34
 See application file for complete search history.

(56) References Cited

U.S. PATENT DOCUMENTS

| | | | |
|---|---|---|---|
| 11,902,417 B2 | 2/2024 | Boesgaard | |
| 2010/0074441 A1* | 3/2010 | Pauker ................. | H04L 9/0625 |
| | | | 713/168 |
| 2010/0111297 A1* | 5/2010 | Pauker ................. | H04L 9/0625 |
| | | | 380/37 |
| 2014/0089204 A1 | 3/2014 | Spies et al. | |

(Continued)

FOREIGN PATENT DOCUMENTS

| EP | 2801061 A1 | 11/2014 |
|---|---|---|
| EP | 3809302 A1 | 4/2021 |

OTHER PUBLICATIONS

Morris Dworkin "Recommendation for Block Cipher Modes of Operation: Methods for Format-Preserving Encryption" U.S. Department of Commerce NIST Special Publication 800-38G, http://dx.doi.org/10.6028/NIST.SP.800-38G, pp. 1-28, Mar. 2016.

(Continued)

*Primary Examiner* — Hee Soo Kim
(74) *Attorney, Agent, or Firm* — Banner & Witcoff, Ltd.

(57) ABSTRACT

Methods and systems disclosed herein describe tokenizing data to generate a secure token that is limited in scope (e.g., directed to a specific recipient) and limited in time (e.g., valid for only a specified period of time). A detokenization process may be employed to recover encrypted data of the secure token without the need for any relational database lookup processes, thereby reducing cost while maintaining robust protection against unintended recipients that attempt to recover the encrypted data.

20 Claims, 10 Drawing Sheets

(56) References Cited

U.S. PATENT DOCUMENTS

| | | | |
|---|---|---|---|
| 2016/0197729 A1 | 7/2016 | Jones | |
| 2017/0026170 A1 | 1/2017 | Farkash et al. | |
| 2017/0124166 A1* | 5/2017 | Thomas | G06F 16/24568 |
| 2018/0091294 A1* | 3/2018 | Iyer | H04L 9/0891 |
| 2018/0337768 A1 | 11/2018 | Minner et al. | |
| 2020/0177370 A1 | 6/2020 | Jordan et al. | |
| 2020/0322126 A1 | 10/2020 | Driscoll | |
| 2021/0049309 A1 | 2/2021 | Su | |

OTHER PUBLICATIONS

Aug. 23, 2023—(WO) International Search Report and Written Opinion—App No. PCT/US2023/020824.

* cited by examiner

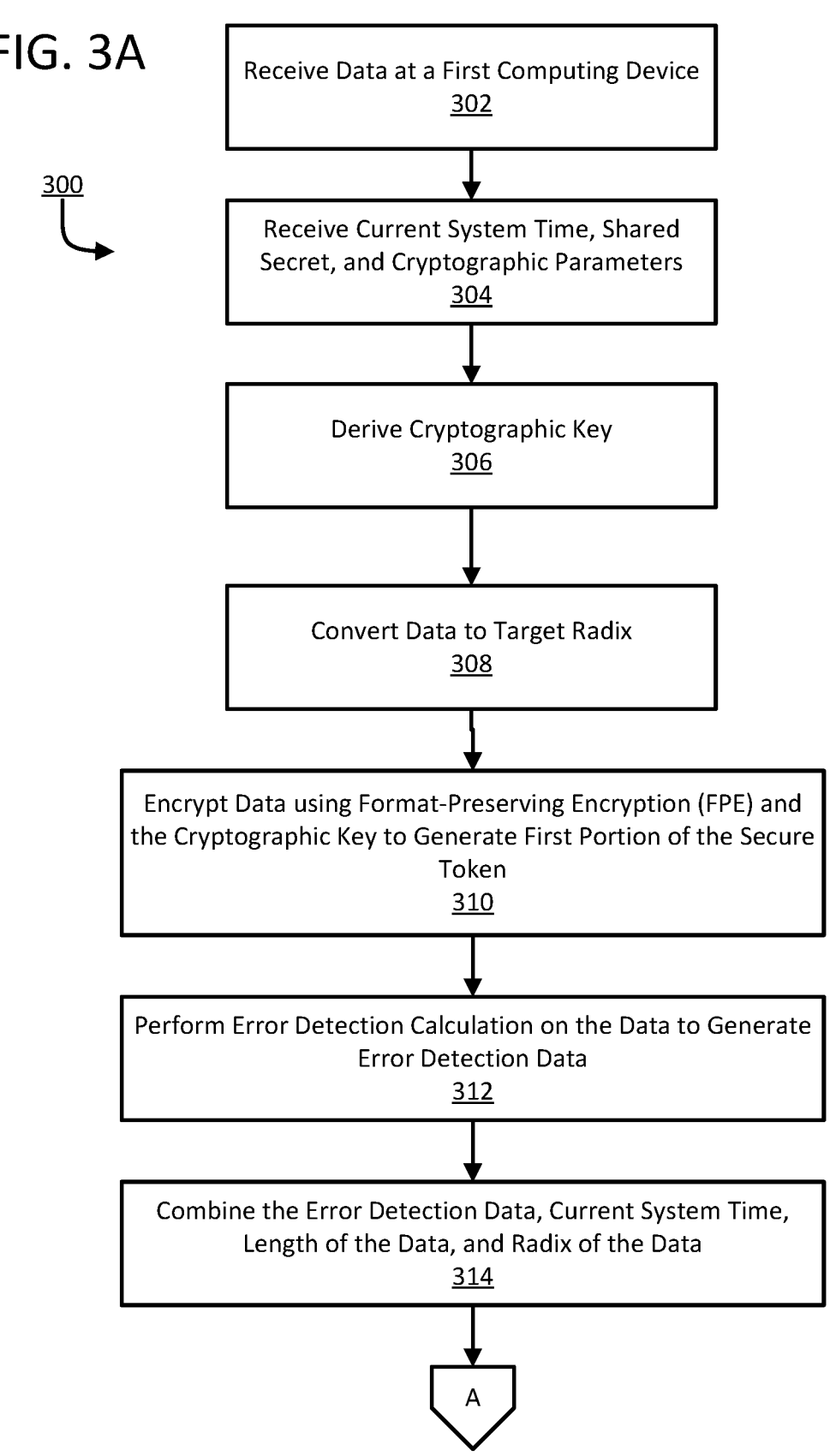

Receive Data at a First Computing Device
302

Receive Current System Time, Shared Secret, and Cryptographic Parameters
304

Derive Cryptographic Key
306

Convert Data to Target Radix
308

Encrypt Data using Format-Preserving Encryption (FPE) and the Cryptographic Key to Generate First Portion of the Secure Token
310

Perform Error Detection Calculation on the Data to Generate Error Detection Data
312

Combine the Error Detection Data, Current System Time, Length of the Data, and Radix of the Data
314

A

Secure Token
406

First Portion of the Secure Token
402

Second Portion of the Secure Token
404

Figure 6A:
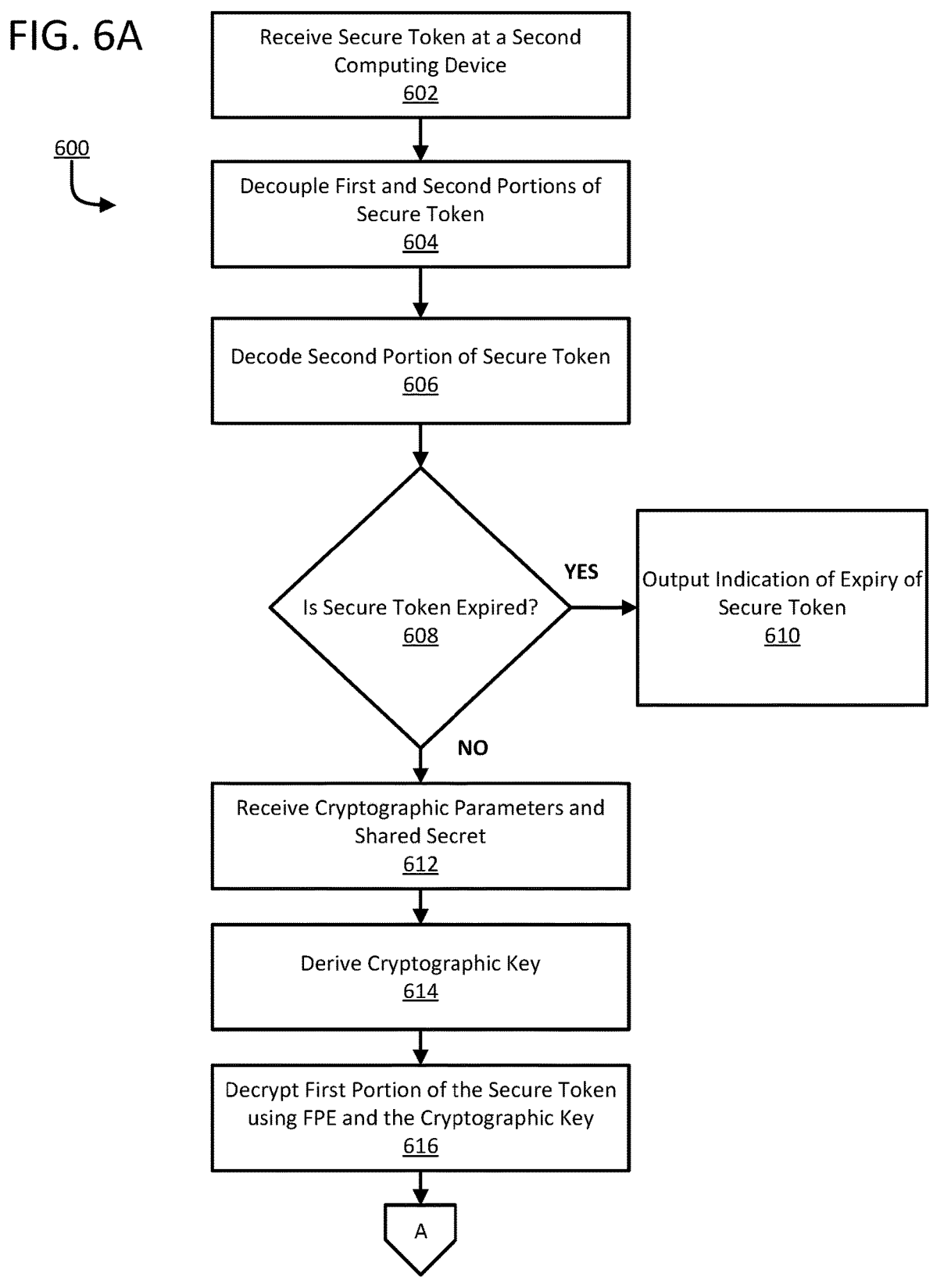

Receive Secure Token at a Second
Computing Device
602

↓

Decouple First and Second Portions of
Secure Token
604

↓

Decode Second Portion of Secure Token
606

↓

Is Secure Token Expired?
608

YES →

Output Indication of Expiry of
Secure Token
610

NO

↓

Receive Cryptographic Parameters and
Shared Secret
612

↓

Derive Cryptographic Key
614

↓

Decrypt First Portion of the Secure Token
using FPE and the Cryptographic Key
616

↓

A

SECURE DATA EXCHANGE USING FORMAT-PRESERVING ENCRYPTION

CROSS-REFERENCE TO RELATED APPLICATION

This application is a continuation of U.S. patent application Ser. No. 17/661,773, filed May 3, 2022, entitled "Secure Data Exchange Using Format-Preserving Encryption," which is hereby incorporated by reference in its entirety.

FIELD OF USE

Aspects of the disclosure generally relate to exchanging sensitive data and more specifically to techniques for encrypting data to exchange the sensitive data in a more secure and reliable manner.

BACKGROUND

Often, sensitive data is to be exchanged or shared. A conventional technique for sharing sensitive data involves generating a token to represent the data. The token is typically a random string that corresponds to the data. The relationship between the token and the sensitive data is stored in persistent storage such as a relational database. Instead of sharing the sensitive data, the token is exchanged. A recipient of the token provides the token to the relational database, which returns the original data through a lookup process (e.g., a token-data exchange).

While this conventional technique allows sensitive data to be provided to a recipient without directly sending the data to the recipient, the conventional technique has many drawbacks. First, the relationship between the token and the sensitive data may need to be stored in numerous relational databases, in order for a token lookup process to be undertaken by various remote computers. This requires the numerous relational databases to be synchronized to store the same information. This is often unachievable or impractical, resulting in the wrong data being provided during a token exchange process. Having different data relationships in different relational databases can therefore cause inconsistent lookup results, which may be exacerbated by any data replication lag between the databases. Second, while caching may be used to boost lookup performance and accuracy, caching is expensive and requires maintenance. Third, a token lookup process is not possible when a relational database is offline or otherwise unavailable. Fourth, additional significant maintenance is required to groom the relational databases to purge expired tokens, thereby compounding the costs required for implementing this conventional technique.

Aspects described herein may address these and other problems, and generally improve the security and reliability of exchanging sensitive data.

SUMMARY

The following presents a simplified summary of various features described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

The present disclosure describes techniques for securely exchanging sensitive data using format-preserving encryption to tokenize data that may be directly provided to an intended recipient.

To securely exchange sensitive data while significantly reducing the costs and complexities typically required by conventional approaches when attempting to do so, the present application describes methods, devices, systems, and/or instructions stored on non-transitory computer-readable media for generating a secure token that includes encrypted data that may be provided to an intended recipient. The secure token may include a first portion that includes the encrypted data. A second portion of the secure token may encode information regarding the data to enable decryption and verification of the validity of the secure token. The secure token may be generated based on variable input parameters, to ensure the secure token is user-specific (e.g., scope-based) and time-constrained (e.g., valid only for a predetermined period of time). As a result, an intended recipient of the secure token may recover the encrypted data without the need for expensive and significant storage and without the need for cumbersome processes to expunge expired tokens, while providing strong encryption to reduce any likelihood of an unintended recipient gaining access to the data. These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIGS. 3A and 3B show an example of a process for tokenizing data that is to be securely shared according to one or more aspects of the disclosure;

FIGS. 6A and 6B show an example of a process for detokenizing data to enable secure data to be securely shared according to one or more aspects of the disclosure;

DETAILED DESCRIPTION

Figure 1:
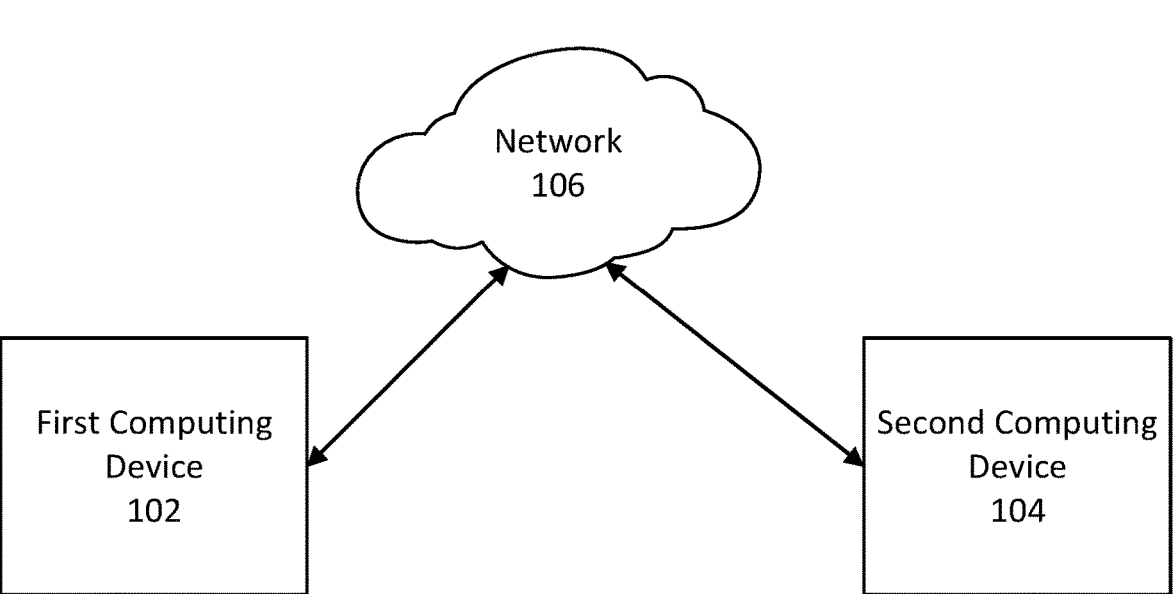
FIG. 1 shows an example of a system in which one or more features described herein may be implemented.

In the following description, reference is made to the accompanying drawings, which form a part hereof, and in which are shown various examples of features of the disclosure and/or of how the disclosure may be practiced. It is to be understood that other features may be utilized and structural and functional modifications may be made without departing from the scope of the present disclosure. The disclosure may be practiced or carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, features discussed herein may relate to methods, devices, systems, and/or instructions stored on non-transitory computer-readable media for securely exchanging data using a secure token.

As an example, data may be received by a first computing device associated with a first user. The data may be sensitive data intended to be shared with a second user associated with a second computing device. A current system time, a predetermined shared secret associated with the first computing device and the second computing device, a predetermined number of iterations associated with a key derivation function, and/or a user identification of the intended recipient may be received by the first computing device. The first computing device may derive, using the key derivation function and based on the current system time, the predetermined shared secret, the predetermined number of iterations, and/or the user identification, a cryptographic key. The first computing device may then encrypt, according to a format-preserving encryption (FPE) algorithm and using the cryptographic key, the data to generate a first portion of a secure token. The first computing device may also determine metadata associated with the data. An error detection calculation may be performed on the data to generate error detection data. The metadata and error detection data may then be combined and encoded to form a second portion of the secure token. The first and second portions of the secure token are then combined to form the secure token, which then may be provided from the first computing device to the second computing device.

To recover the sensitive data, the second computing device may receive the secure token and the user identification. The second computing device may decode the second portion of the secure token to recover the metadata and the error detection data. The metadata may be used to determine the current system time, a length of the data, and/or a radix of data. The second computing device may determine if the secure token is expired or not based on the recovered current system time. The second computing device may independently derive the cryptographic key. The second computing device may then decrypt the first portion of the secure token to generate recovered data. The second computing device may perform the decryption according to the FPE algorithm, based on the user identification, and/or using the cryptographic key. An error detection calculation may be performed on the recovered data to generate confirmation error detection data, which may be compared to the recovered error detection data to verify if the recovered data is accurate and reliable or not. If the confirmation error detection data matches the recovered error detection data, then the secure token may be considered valid and the recovered data may be considered to be verified.

The tokenization and detokenization techniques described herein may enable sensitive data to be shared in a secure manner, by leveraging powerful cryptographic algorithms and key derivation processes. Further, tokenization and detokenization techniques described herein enable the sensitive data to be shared without any need to rely on relational databases, thereby significantly improving the reliability and availability of the exchange of sensitive data while simultaneously reducing the complexity of securing and recovering the protected data.

FIG. 1 illustrates a system 100 for securely exchanging data using format-preserving encryption (FPE) in accordance with one or more aspects described herein. The system 100 may include a first computing device 102, a second computing device 104, and a network 106.

The first computing device 102 may be any type of computing device, including a mobile or a portable device. For example, the first computing device 102 may be a smartphone, a laptop, a tablet, a desktop, or an equivalent thereof. The first computing device 102 may be associated with a first user that would like to securely exchange data with a second user associated with the second computing device 104. The second user computing device 104 may also be any type of computing device, including a mobile or a portable device, and may be, for example, a smartphone, a laptop, a tablet, a desktop, or an equivalent thereof.

The network 106 may be any type of communications and/or computer network. The network 106 may include any type of communication mediums and/or may be based on any type of communication standards or protocols. The network 106 communicatively couples the first user computing device 102 and the second user computing device 104, to enable data or other information to be shared between the first computing device 102 and the second computing device 104.

To securely exchange or share sensitive data, the system 100, for example, enables the first computing device 102 to tokenize the sensitive data. The resulting secure token may include an encrypted version of the sensitive data. The sensitive data may be encrypted using an FPE algorithm or protocol. The secure token may also include information for verifying the validity of the secure token and for recovering the sensitive data (e.g., for decrypting the encrypted sensitive data). The first computing device 102 may provide the secure token to the second computing device 104.

The second computing device 104 may use information included in the secure token to verify that the secure token is not expired, and to recover the encrypted sensitive data (e.g., detokenize the sensitive data). In this manner, sensitive data may be exchanged between the first computing device 102 and the second computing device 104 without relying on any external relational databases often required to recover sensitive data from a token. Further, the secure token may be time-sensitive and therefore available for recovering the sensitive data for only a certain period of time, thereby improving security. Additionally, cryptographic keys used in encrypting and decrypting the sensitive data provide additional security by significantly reducing the likelihood of a third party being able to decrypt the sensitive data. These and other advantages of the techniques for securely exchanging sensitive data are described in more detail herein.

Figure 2:
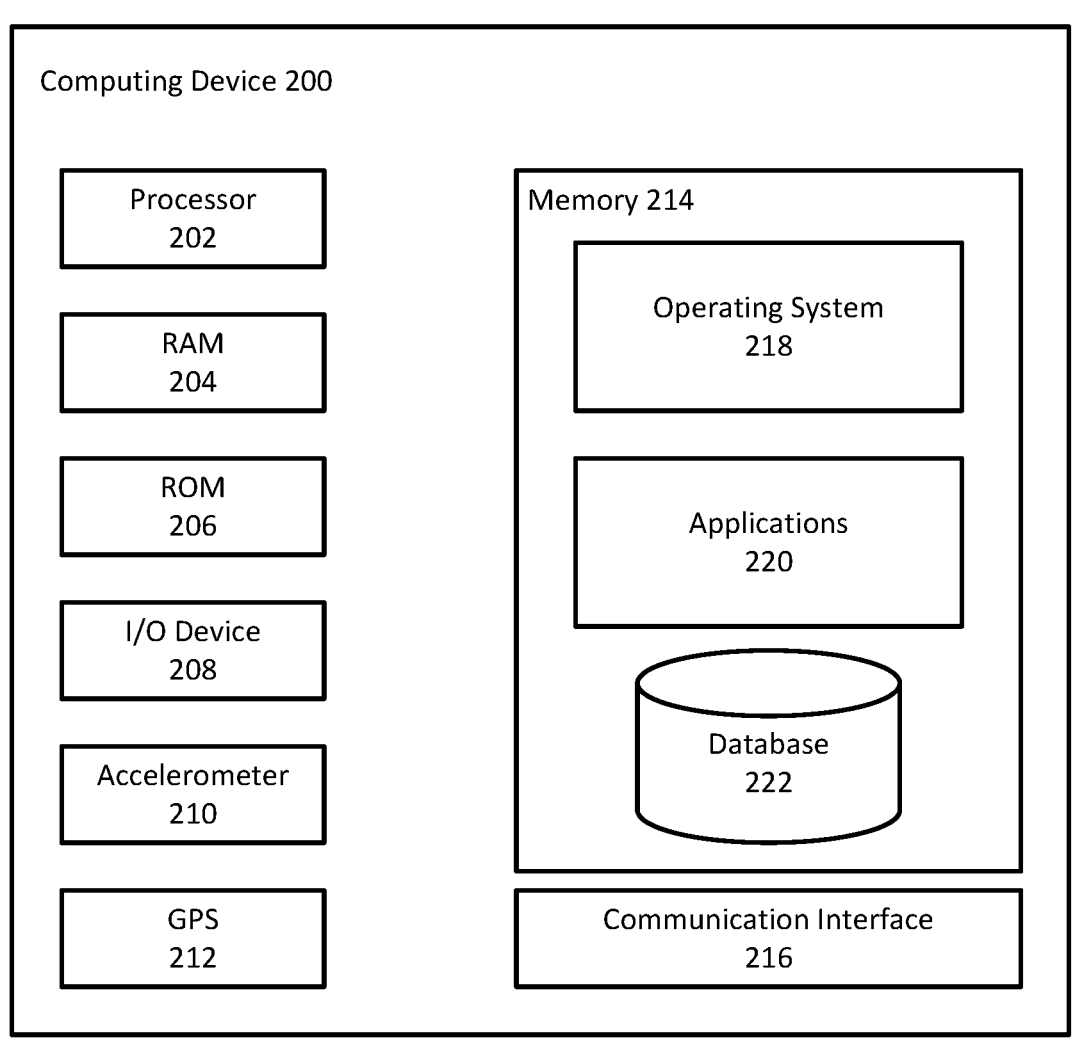
FIG. 2 shows an example computing device.

Any of the devices, components, and/or systems described herein may be implemented, in whole or in part, using one or more computing devices described with respect to FIG. 2. Turning now to FIG. 2, a computing device 200 that may be used with one or more of the computational systems is described. The computing device 200 may comprise one or more processors 202 for controlling overall operation of the computing device 200 and its associated components, including random access memory (RAM) 204, read-only memory (ROM) 206, input/output device 208, accelerometer 210, global-position system (GPS) antenna 212, memory 214, and/or communication interface 216. A bus (not shown in FIG. 2 for simplicity) may interconnect processor(s) 202, RAM 204, ROM 206, I/O device 208, accelerometer 210, global-position system receiver/antenna 212, memory 214, and/or communication interface 216. Computing device 200 may represent, be incorporated in, and/or comprise various devices such as a desktop computer, a computer server, a gateway, a mobile device, such as a laptop computer, a tablet computer, a smartphone, any other types of mobile computing devices, and the like, and/or any other type of data processing device.

Input/output (I/O) device 208 may comprise a microphone, keypad, touch screen, and/or stylus through which a user of the computing device 200 may provide input, and may also comprise one or more of a speaker for providing audio output and a video display device for providing textual, audiovisual, and/or graphical output. Software may be stored within memory 214 to provide instructions to processor 202 allowing computing device 200 to perform various actions. For example, memory 214 may store software used by the computing device 200, such as an operating system 218, application programs 220, and/or an associated internal database 222. The various hardware memory units in memory 214 may comprise volatile and nonvolatile, removable and non-removable media implemented in any method or technology for storage of information such as computer-readable instructions, data structures, program modules, or other data. Memory 214 may comprise one or more physical persistent memory devices and/or one or more non-persistent memory devices. Memory 214 may comprise RAM, ROM, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 202.

Accelerometer 210 may be a sensor configured to measure accelerating forces of computing device 200. Accelerometer 210 may be an electromechanical device. Accelerometer 210 may be used to measure the tilting motion and/or orientation computing device 200, movement of computing device 200, and/or vibrations of computing device 200. The acceleration forces may be transmitted to the processor 202 to process the acceleration forces and determine the state of computing device 200.

GPS receiver/antenna 212 may be configured to receive one or more signals from one or more global positioning satellites to determine a geographic location of computing device 200. The geographic location provided by GPS receiver/antenna 212 may be used for navigation, tracking, and positioning applications. In this regard, the geographic may also include places and routes frequented by the first user.

Communication interface 216 may comprise one or more transceivers, digital signal processors, and/or additional circuitry and software, protocol stack, and/or network stack for communicating via any network, wired or wireless, using any protocol as described herein.

Processor 202 may comprise a single central processing unit (CPU), which may be a single-core or multi-core processor, or may comprise multiple CPUs. Processor(s) 202 and associated components may allow the computing device 200 to execute a series of computer-readable instructions (e.g., instructions stored in RAM 204, ROM 206, memory 214, and/or in other memory of computing device 200) to perform some or all of the processes described herein. Although not shown in FIG. 2, various elements within memory 214 or other components in computing device 200, may comprise one or more caches, for example, CPU caches used by the processor 202, page caches used by the operating system 218, disk caches of a hard drive, and/or database caches used to cache content from database 222. A CPU cache may be used by one or more processors 202 to reduce memory latency and access time. A processor 202 may retrieve data from or write data to the CPU cache rather than reading/writing to memory 214, which may improve the speed of these operations. In some examples, a database cache may be created in which certain data from a database 222 is cached in a separate smaller database in a memory separate from the database 222, such as in RAM 204 or on a separate computing device. For example, in a multi-tiered application, a database cache on an application server may reduce data retrieval and data manipulation time by not needing to communicate over a network with a back-end database server. These types of caches and others may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the disclosure.

Figure 3B:
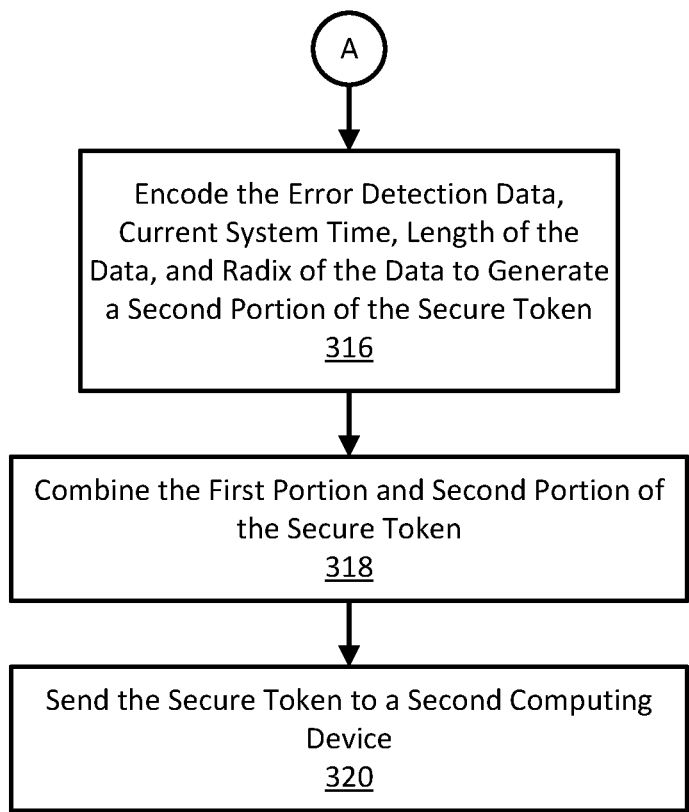

FIGS. 3A and 3B show a flow chart of a process 300 for tokenizing data that is to be securely shared according to one or more aspects of the disclosure. The process 300 may represent a portion of a process for securely exchanging data using FPE according to one or more aspects of the disclosure. For example, the process may represent a process by which a first computing device (e.g., the first computing device 102 of FIG. 1) secures data (e.g., sensitive data) and then provides the secure data to a second computing device (e.g., the second computing device 104 of FIG. 1).

Some or all of the steps of process 300 may be performed using one or more computing devices (e.g., an application executing on a computing device) as described herein, including, for example, a client device, a server, or a memory and a processor configured to perform the methods described herein. For example, any portion of the process may be performed using the first computing device 102 of FIG. 1, the second computing device 104 of FIG. 1, or the computing device 200 of FIG. 2.

In step 302, a first computing device may receive data to be provided to a second computing device. The data may comprise any type of data and may comprise sensitive data (e.g., a confidential document, personal information, etc.). The data may be stored in a memory associated with and/or accessible by the first computing device. The data may be data provided by the first user (e.g., inputted by the first user).

In step 304, the first computing device may receive a current system time, a predetermined shared secret, cryptographic parameters, and/or a user identification (ID). The current system time may represent any time or measure of time accessible to the first computing device and the second computing device. The current system time may comprise a value or other measure of time indicating an amount of time that has elapsed from some predetermined prior time or previous point in time. As an example, the predetermined prior time may be a particular point in time (e.g., Jan. 1, 2015) and the current system time may be expressed as a number of hours since the particular point in time (e.g., 63,131 hours). The current system time may be determined using an epoch converter. The current system time may be derived based on a system clock shared or otherwise available to the first computing device and the second computing device. The system clock may be tamper-proof (e.g., incapable of being tampered with) and may be accessible to the first computing device and the second computing device.

The system clock may provide a time to an epoch converter which derives the current system time as described herein.

The predetermined shared secret may be a master password or other secure data. The predetermined shared secret may be stored and/or otherwise accessible to the first computing device and the second computing device. The predetermined shared secret may be derived using a private key of the first computing device and a public key of the second computing device. A first asymmetric key pair of the first computing device (including the private key above) and a second asymmetric key pair of the second computing device (including the public key above) may be determined using any key derivation protocol or algorithm including, for example, Elliptic Curve Cryptography (ECC), Rivest Shamir Adelman (RSA), etc. The predetermined shared secret may be generated using any suitable key agreement protocol, including, for example, Elliptic-curve Diffie-Hellman (ECDH). The predetermined shared secret may comprise any data or value. The predetermined shared secret may represent information that is well-protected and highly unlikely to be shared or compromised, and only known to the first computing device and the second computing device. The predetermined shared secret may represent a seed of a key derivation function.

The cryptographic parameters may be any parameter used as an input into a key derivation algorithm or protocol including, for example, Password-Based Key Derivation Function 1 (PBKDF1) or Password-Based Key Derivation Function 2 (PBKDF2). As an example, the cryptographic parameters may comprise an indication of a number of iterations desired for PBKDF2. In general, an output of a key derivation process may be more secure as the number of iterations is increased. The cryptographic parameters may be stored and/or otherwise accessible to the first computing device and the second computing device.

The user ID may comprise an identifier associated with an intended recipient of the data. As an example, the user identification may comprise an identifier associated with the second user associated with the second computing device. The user ID may comprise any data or value. The user ID may also be an identifier associated with the sender. In general, as discussed herein, the user ID may generally be any identifier that may be used to generate a secure token and also used to recover data from the secure token. As an example, the user ID may be a phone number or ID of a user that generates the token, and may be used in a process to generate a secure token based on data and used in a process to recover the data from the secure token.

The current system time, the predetermined shared secret, the cryptographic parameters, and/or the user ID may be associated with a key derivation function, algorithm, or protocol. As an example, the current system time, the predetermined shared secret, the cryptographic parameters, and/or the user ID may be associated with the PBKDF2 key derivation function. As a further example, the current system time, the predetermined shared secret, the cryptographic parameters, and/or the user ID may be input parameters to the PBKDF2 key derivation function, as described in more detail further herein.

In step 306, a cryptographic key may be derived. The cryptographic key may be derived using a key derivation function. The key derivation function may be any key derivation function including, for example, the PBKDF2 key derivation function. The cryptographic key may be derived based on the current system time, the predetermined shared secret, the cryptographic parameters (e.g., the predetermined number of iterations), and/or the user ID. For example, the current system time, the predetermined shared secret, the cryptographic parameters (e.g., the predetermined number of iterations), and/or the user ID may represent input parameters to the key derivation function. Other input parameters to the key derivation function may include a desired length of the output of the key derivation function.

As a first example, the user ID and the current system time may form a cryptographic salt. The user ID and the current system time may be combined in any manner to form the cryptographic salt. For example, the user ID and the current system time may be concatenated to form the cryptographic salt. In another example, the user ID and the current system time may be hashed to form the cryptographic salt. As such, in the first example, the cryptographic key may be derived using the PBKDF2 key derivation function, based on a specified number of iterations, the predetermined shared secret, and/or a cryptographic salt formed from the user ID and the current system time.

In step 308, the data is converted to a target radix. Step 308 may include determining a radix of the data that is to be secured. For example, the data to be secured may be binary data and the radix of the binary data may be detected or determined to be Base 2. Step 308 may also include determining a target radix. For example, the target radix may be determined to be Base 62. Accordingly, in step 308, the data may be converted from a first format to a second format (from binary data to a Base 62 string) based on the initial determined radix of the data and the determined target radix of the data.

In general, determining an initial radix or a target radix, and converting data from a first format to a second format may involve one or more of: determining an initial number base for data, determining a target or desired number base for the data, determining a character set for the data, and/or determining whether the data is initially or targeted to be expressed in a binary format, a numerical format, an alphabetic format, or an alphanumeric format.

In step 310, the data is encrypted. The data may be encrypted using a format-preserving encryption (FPE) algorithm such as, for example, the FPE algorithm specified in National Institute of Standards and Technology (NIST) Special Publication 800-38G, entitled "Recommendation for Block Cipher Modes of Operation: Methods for Format-Preserving Encryption." The data may be encrypted using the FPE algorithm and using the cryptographic key. As a result of encrypting the data using the FPE algorithm and using the cryptographic key, a first portion of a secure token may be generated.

The encrypted data generated using the FPE algorithm may have a length that is equal to a length of the data (e.g., after being converted to the target radix). For example, the initial data may comprise 10 decimal digits which may be converted to a Base 62 string of 5 alphanumeric characters. The FPE algorithm may encrypt the 5 alphanumeric characters to generate 5 alphanumeric characters that represent the encrypted data. In this manner, the format or length of the output or encrypted data generated by the FPE algorithm (e.g., output 5 alphanumeric characters) matches the format or length of the data the FPE algorithm operates on (e.g., input 5 alphanumeric characters). In other words, the FPE algorithm allows for encrypting in such a way that the output (e.g., the ciphertext) is in the same format as the input (e.g., the plaintext), with format referring to a length of the input and output data and sets of characters used (alphabetic, alphanumeric, etc.).

In step 312, an error detection calculation may be performed on the data to generate error detection data. As an example, the error detection calculation may be based on a checksum or cyclic redundancy check (CRC) algorithm and the error detection data generated may be checksum data or CRC-16 data. In another example, the error detection calculation may be a message authentication code (MAC), such as a hash-based message authentication code (HMAC).

In step 314, the error detection data, the current system time, a length of the data, and/or a radix of the data may be combined. The length of the data may be represented by an indication of the length of the data (e.g., a number of characters or digits comprising the data). The radix of the data may be represented by an indication of the radix of the data (e.g., binary data may be indicated by a radix value equal to "1", numerical data may be indicated by a radix value of "2"). Detecting or determining the length of the data and/or detecting or determining the radix of the data may be considered to be detection or determination of metadata associated with the data. The metadata of the data may be determined in conjunction with or as part of step 308.

The error detection data, the current system time, the length of the data, and/or the radix of the data may be combined in any manner. As a first example, the error detection data, the current system time, the length of the data, and/or the radix of the data may be combined by concatenating the error detection data, the current system time, the length of the data, and/or the radix of the data in a predetermined manner. As a second example, the error detection data, the current system time, the length of the data, and/or the radix of the data may be combined by interleaving according to a predetermined interleaving pattern.

In step 316, the combined error detection data, the current system time, the length of the data, and/or the radix of the data may be encoded to form a second portion of the secure token. The combined error detection data, the current system time, the length of the data, and/or the radix of the data may be encoded by converting this combined data to a predetermined length string of a target radix.

As an example, the error detection data may be a CRC-16 checksum represented by 16 bits; the length of the data may be represented by 8 bits; the radix may be represented by 4 bits, and the current time may be represented by 20 bits. Combined, the error detection data, the current system time, the length of the data, and the radix of the data may be represented by a combined 48 bits, or 6 bytes. The combined 48 bits may be converted to another format or radix. As an example, base 62 encoding of the 48 bits may be used to generate an alphanumeric string of a particular length.

In step 318, the first portion of the secure token and the second portion of the secure token may be combined to form the secure token. The first portion of the secure token and the second portion of the secure token may be combined in any manner. As a first example, the first portion of the secure token and the second portion of the secure token may be combined by concatenating the first portion of the secure token and the second portion of the secure token in a predetermined manner. As a second example, the first portion of the secure token and the second portion of the secure token may be combined by interleaving according to a predetermined interleaving pattern.

Figure 4:
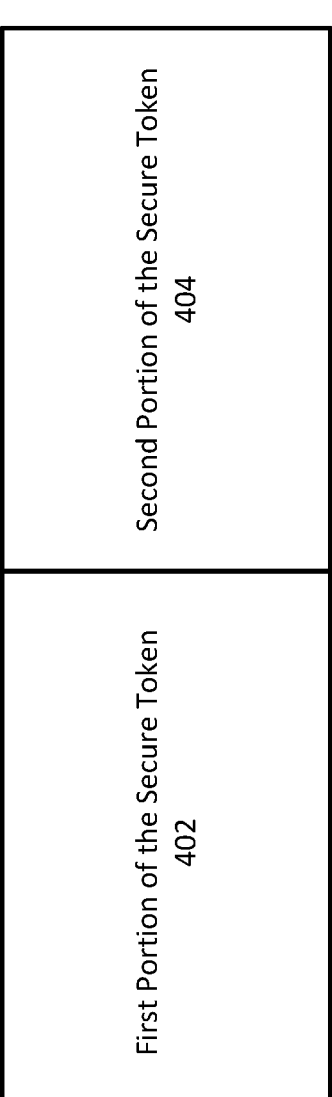
FIG. 4 shows a first example for combining a first portion of a secure token and a second portion of the secure token.

FIG. 4 shows a first example for combining a first portion of a secure token 402 and a second portion of the secure token 404 to form the overall secure token 406. The first portion of the secure token 402 may be generated in step 310. The second portion of the secured token 404 may be generated in step 316. As shown in FIG. 4, the first portion of the secure token 402 is concatenated with the second portion of the secure token 404. In particular, the second portion of the secure token 404 is shown appended to the first portion of the secure token 402. The first portion of the secure token 402 and the second portion of the secure token 404 may be concatenated in any manner. For example, the second portion of the secure token 404 may be positioned before the first portion of the secure token 402 (e.g., such that the first portion of the secure token 402 is appended to the second portion of the secure token 404).

Figure 5:
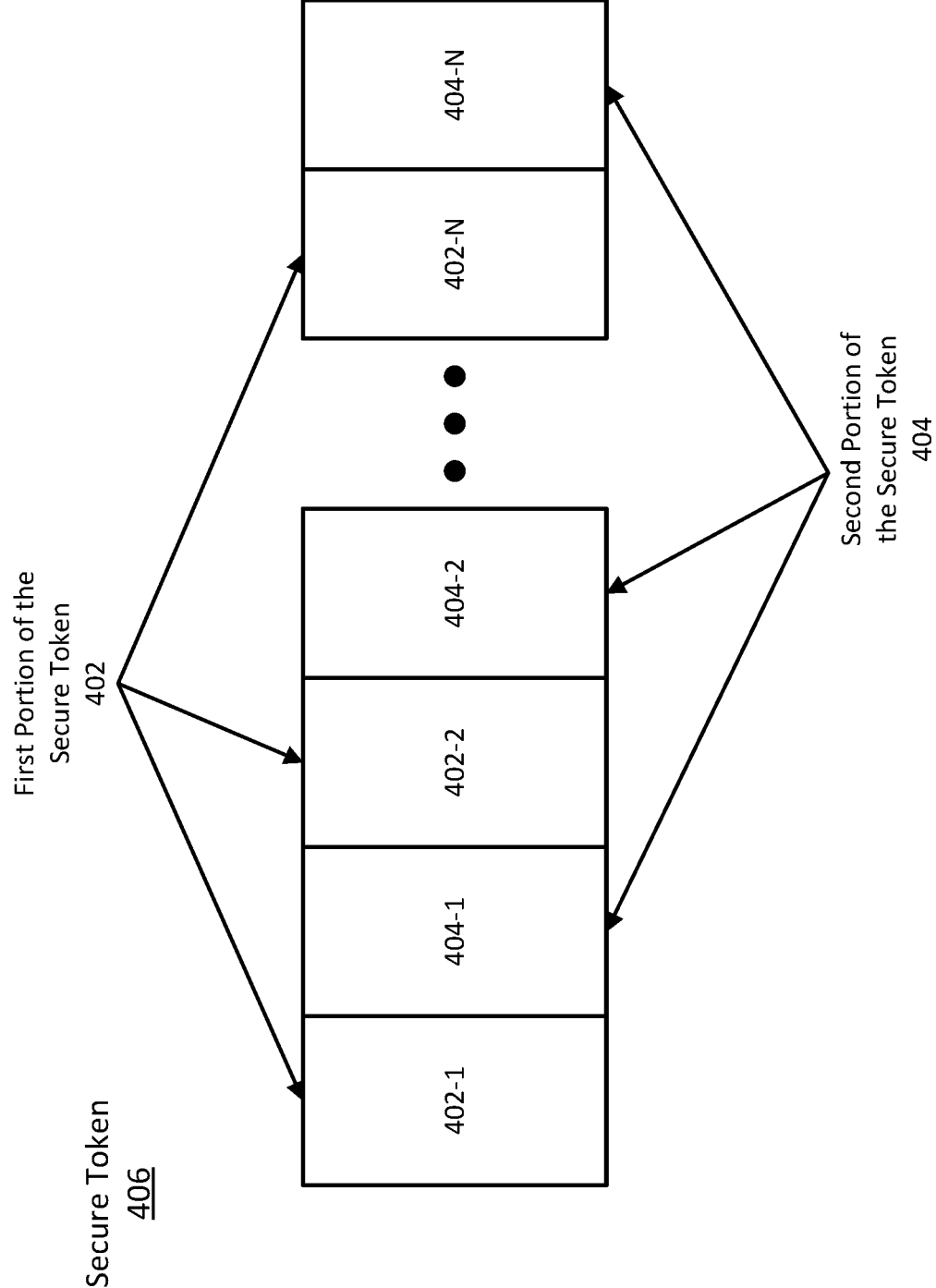
FIG. 5 shows a second example for combining the first portion of the secure token and the second portion of the secure token.

FIG. 5 shows a second example for combining the first portion of the secure token 402 and the second portion of the secure token 404 to form the overall secure token 406. As shown in FIG. 5, the first portion of the secure token 402 may be divided or broken into N different components, shown as 402-1 through 402-N. The second portion of the secure token 404 may also be divided or broken into N different components, shown as 404-1 through 404-N. The N different components of the first portion of the secure token 402 and the N different components of the second portion of the secure token 404 may be interleaved as shown in FIG. 5. In particular, the first component 404-1 of the second portion of the secure token 404 is positioned adjacent to the first component 402-1 of the first portion of the secure token 402. The second component 402-1 of the first portion of the secure token 402 is positioned adjacent to the first component 404-1 of the second portion of the secure token 404.

This pattern of alternating components of the first portion of the secure token 402 and the second portion of the secure token 404 may continue until the full secure token 406 is formed. The pattern may be considered to be an interleaving pattern and may be predetermined or predefined, such that the secure token 406 is formed each time in accordance with the interleaving pattern. Any interleaving pattern may be used. The components of the first portion of the secure token 402 and the second portion of the secure token 404 used to follow the interleaving pattern may each be of the same size or may be of different sizes. The interleaving pattern may be known or otherwise accessible to both the first computing device and the second computing device.

In step 320, the secure token may be sent by the first computing device to the second computing device. The secure token may be transmitted by the first computing device (e.g., the first computing device 102) to the second computing device (e.g., the second computing device 104) over any network (e.g., the network 106).

The steps of process 300 may be performed in any suitable order, and any step may be combined with another other step of process 300.

Having discussed a process for tokenizing data according to the techniques described herein, attention will now turn to a process for detokenizing data to further support the exchange of secure data.

Figure 6B:
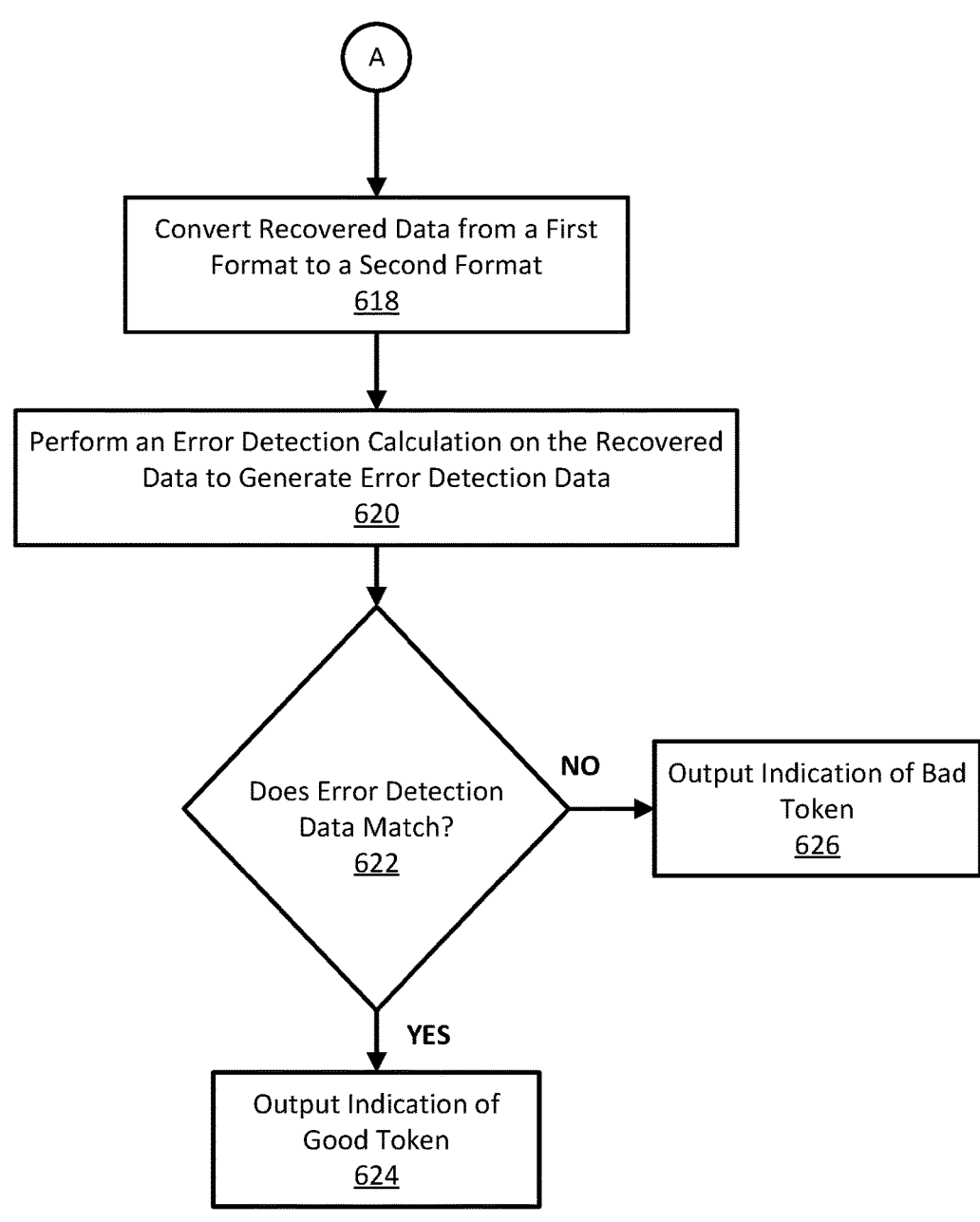

FIGS. 6A and 6B show a flow chart of a process 600 for detokenizing data to enable secure data to be shared according to one or more aspects of the disclosure. The process 600 may represent a portion of a process for securely exchanging data using FPE according to one or more aspects of the disclosure. For example, the process may represent a process by which a second computing device (e.g., the second computing device 104 of FIG. 1) recovers data (e.g., sensitive data) from a secure token provided by a first computing device (e.g., the first computing device 102 of FIG. 1).

Some or all of the steps of process 600 may be performed using one or more computing devices (e.g., an application executing on a computing device) as described herein, including, for example, a client device, a server, or a memory and a processor configured to perform the methods described herein. For example, any portion of the process may be performed using the first computing device 102 of FIG. 1, the second computing device 104 of FIG. 1, or the computing device 200 of FIG. 2.

In step 602, the second computing device may receive a secure token from a first computing device. The secure token may be generated by the first computing device according to process 300. The first computing device may send the secure token to the second computing device. The secure token may comprise secure data intended to be provided to the second computing device. The data may comprise any type of data and may comprise sensitive data (e.g., a confidential document, personal information, etc.).

In step 604, a first portion of the secure token may be decoupled from a second portion of the secure token. The first portion of the secure token and the second portion of the secure token may be combined in any manner (e.g., by concatenation or interleaving), as described in step 318 of process 300. The second computing device may be aware of the manner in which the first portion of the secure token and the second portion of the secure token may be combined; therefore, the second computing device performs one or more operations to separate the first portion of the secure token and the second portion of the secure token in view of the known manner of combining (e.g., by deconcatenating or deinterleaving the first portion of the secure token and the second portion of the secure token).

In step 606, the second portion of the secure token may be decoded. The second portion of the secure token may be decoded by converting the second portion of the secure token from a predetermined length string of a target radix back to an initial radix. As an example, the second portion of the secure token may be encoded according to Base 62 encoding, and may be decoded to form a representation of the second portion of the secure token as a binary sequence or a numerical value. The decoded second portion of the secure token may include recovered error detection data, a recovered current system time, a recovered length of the data, and a recovered radix of the data. These components of the decoded second portion of the secure token may be extracted and stored.

In step 608, a determination may be made as to whether the secure token is expired (e.g., invalid) or unexpired (e.g., valid). The secure token may be valid for a predetermined amount of time. The recovered current system time may represent a first time from which the secure token is valid. The secure token may be valid, for example, for 24 hours (e.g., the predetermined amount of time). Based on a comparison of the now current system time to the recovered current system time, the second computing device may determine if more or less than the predetermined amount of time (e.g., 24 hours) has elapsed.

If the difference between the now current system time and the recovered current system time is less than the predetermined amount of time (e.g., 24 hours), then the second computing device may determine that the secure token is unexpired and therefore valid. As such, the process 600 would proceed to step 612. The second computing device may output an indication to the second user indicating that the secure token is unexpired and still valid as it proceeds from step 608 to step 612.

If the difference between the now current system time and the recovered current system time is greater than the predetermined amount of time (e.g., 24 hours), then the second computing device may determine that the secure token is expired and therefore invalid. As such, the process 600 would proceed to step 610.

At step 610, the second computing device may output an indication to the second user indicating that the secure token is expired and may no longer be valid. Any amount of time may be predetermined for specifying the validity of a secure token. The amount of time may be known or otherwise accessible (e.g., in a secure manner) to both the first computing device and the second computing device.

As with the determination of the current system time as described in relation to step 304 of the process 300, the now current time may be derived based on a system clock shared or otherwise available to the first computing device and the second computing device. The system clock may provide a time to an epoch converter which derives the now current system time which may then be used to compare with the recovered current system time. In this manner, the current system time may represent a time when the secure token via the process 300 was generated, while the now current system time may represent a later time when the secure token via the process 300 was provided to another computing device for detokenization. The recovered current system time may be a representation of the current system time.

The predetermined expiry time of the secure token enables the secure tokens to be managed without requiring additional operations to locate secure tokens in a memory, verify whether the secure tokens are valid or not, and also remove expired tokens, as the secure tokens generated by the techniques described herein expire on their own (e.g., the secure tokens have an inherent validity period).

In step 612, the second computing device may receive the cryptographic parameters and the predetermined shared secret, for example, based on a determination that the secure token has not expired. The cryptographic parameters may comprise an indication of a number of iterations to perform for a key derivation function. The cryptographic parameters and the predetermined shared secret may be stored by the second computing device or may be otherwise securely accessible by the second computing device.

The cryptographic parameters received in step 612 of the process 600 may be the same cryptographic parameters received in step 304 of the process 304. The predetermined shared secret received in step 612 of the process 600 may be the same predetermined shared secret received in step 304 of the process 304.

In step 614, the cryptographic key may be derived in a manner similar to step 306 of process 300 (or in the same manner as step 306). The cryptographic key may be derived using a key derivation function. The key derivation function may be any key derivation function including, for example, the PBKDF2 key derivation function. The cryptographic key may be derived based on the recovered current system time, the predetermined shared secret, the predetermined number of iterations, and/or the user ID (e.g., an identifier of the intended recipient such as the user ID of the second user associated with the second computing device). For example, the recovered current system time, the predetermined shared secret, the predetermined number of iterations, and/or the user ID may represent input parameters to the key derivation function. Other input parameters to the key derivation function may include a desired length of the output of the key derivation function (e.g., the desired key length). As described above, the user ID may be any identifier (e.g., associated with any user) that is consistently used in a process for generating the secure token and used in a process for recovering data from the secure token.

As an example, similar to step 306 of the process 300, example, the user ID and the recovered current system time may form a cryptographic salt. The user ID and the recovered current system time may be combined in any manner to form the cryptographic salt. For example, the user ID and the recovered current system time may be concatenated to form the cryptographic salt. Additionally or alternatively, the cryptographic salt may be generated by hashing the user ID and the recovered current system time. As such, the cryptographic key may be derived using the PBKDF2 key derivation function, based on a specified number of iterations, the predetermined shared secret, and/or a cryptographic salt formed from the user ID and the recovered current system time.

The cryptographic key derived in step 614 will match the cryptographic key derived in step 306 if the recovered current system time used in step 614 matches the current system time received in step 304 and used in step 306, and if the cryptographic parameters and predetermined shared secret used in step 306 match the cryptographic parameters and predetermined shared secret used in step 614. In general, it is to be understood that in order to securely share data based on the process 300 and the process 600, it is intended for the cryptographic keys derived in each process to match.

In step 616, the first portion of the secured token may be decrypted using an FPE algorithm and based on the cryptographic key. The FPE algorithm may be the same FPE algorithm used in step 310 for encryption using the cryptographic key. As a result of decrypting the first portion of the secure token, recovered data may be obtained. The recovered data will match the original data provided to the first computing device in step 302 if the same FPE algorithm is used, if the same cryptographic key is used, and if the same user ID is used, as explained in more detail herein (and accounting for any radix/formatting changes to the data). If a different user ID is used (e.g., the user ID of the user associated with the first computing device rather than the user ID of the user associated with the second computing device), then the recovered data may not match the original data. As described herein, if the cryptographic key derived differs from the cryptographic key used to generate the secure token, then the original data may not be recoverable. Further, if the secure token is corrupted in some manner (e.g., during transmission from the first computing device to the second computing device), then the recovered data may not match the original data. In general, if any of the inputs used to derive the cryptographic key in the process 600 differ from the corresponding inputs used to derive the corresponding cryptographic key in the process 300, then the secure token operated on in the process 600 will be unable to properly recover the data encrypted within the secure token (e.g., incorrect data not matching the input data of the process 300 will be recovered). This may occur, for example, if a different user ID is used in the process 600 from the user ID used in the process 300. Further, if the secure token is corrupted en route to the second computing device (e.g., interference or other noise corrupts the data making up the secure token), then the original data from the process 300 may not be recoverable by the process 600.

In step 618, the recovered data may be converted from a first format to a second format. The first format may be the target radix determined in step 308, and the second format may correspond to the format of the data prior to being converted to the target radix in step 308. As an example, the recovered data may be encoded according to Base 62 (e.g., the first format), and the recovered data may be converted to a decimal representation.

The recovered length of the data may also be used to determine if the recovered data in the second format should be padded. That is, when converting the recovered data to the second format, the recovered length of the data determined in step 606 may inform whether and how much padding (e.g., zero-padding) should be performed on the recovered data to ensure the length of the recovered data matches the length of the original data encrypted by the first computing device. Padding (e.g., zero-padding) may also be correspondingly implemented in relation to the process 300. For example, the original sensitive data to share may be "123456789" which is padded to 10 digits as "0123456789."

In step 620, an error detection calculation may be performed on the recovered data to generate error detection data. The error detection calculation may be the same error detection calculation performed in step 312. As an example, the error detection calculation may be based on a checksum or cyclic redundancy check (CRC) algorithm and the error detection data generated may be checksum data or CRC-16 data. Additionally or alternatively, the error detection calculation may be a message authentication code, such as HMAC.

In step 622, the error detection data generated in step 620 may be compared to the recovered error detection data obtained in step 606. If the error detection data generated in step 620 matches the recovered error detection data obtained in step 606, then the recovered data may be outputted in step 624. Further, in step 624, an indication that the recovered data is accurate and/or that the secure token received from the first computing device is valid may be provided. In this manner, the user of the second computing device may feel confident that the recovered data, now accessible to the user of the second computing device, is correct and reliable.

If the error detection data generated in step 620 does not match the recovered error detection data obtained in step 606, then such an indication may be outputted in step 626. The error detection data generated in step 620 may not match the recovered error detection data obtained in step 606 if the secure token is corrupted or if the incorrect user ID is used. Further, in step 626, an indication that the secure token is not valid (e.g., unexpired but includes bad data) may be provided by the second computing device. In this manner, the user of the second computing device may clearly be informed as to any issues regarding the validity of the secure token or the accuracy and reliability of the recovered data.

As with the steps of process 300, the steps of process 600 may be performed in any suitable order, and any step may be combined with another other step of process 600.

Together, the process 300 and the process 600 enable sensitive data to be shared or exchanged. The sensitive data may be exchanged between users, computing devices, and/or partners. As described herein, the techniques for securely sharing data enable sensitive data to be tokenized using strong encryption algorithms. The generated secure token is time-sensitive and scope-based. The secure token is time-sensitive in that a validity period of the secure token may be set and/or agreed upon. Further, the secure token is generated based on derivation of a cryptographic key that is based on a current system time. The secure token is scope-based in that a secure token generated for a particular user (e.g., Alice, as the intended recipient and using Alice's user ID) will be different from a secure token generated for another user (e.g., Bob, as another intended recipient using Bob's user ID).

The process 300 and the process 600 together leverage NIST approved FPE algorithms and key derivation algorithms to build secure tokens with robust security features, and without the need for relational databases or caching as typically required for conventional token sharing schemes. The data included with a secure token is not recoverable without using the proper cryptographic key. As described herein, and in relation to the process 300 and the process 600, the cryptographic keys used to encrypt data are continuously changing, as derivation of a cryptographic key is based on a changing current system time. The changing nature of the cryptographic key over time helps secure the other input parameters to the cryptographic key derivation process, including the predetermined shared secret.

Having rounded out the discussion of securely sharing data by describing techniques for recovering tokenized data, attention will now turn to functional components and operations for implementing the process of 300, while including an example of actual data used to form a secure token via the process 300.

Figure 7:
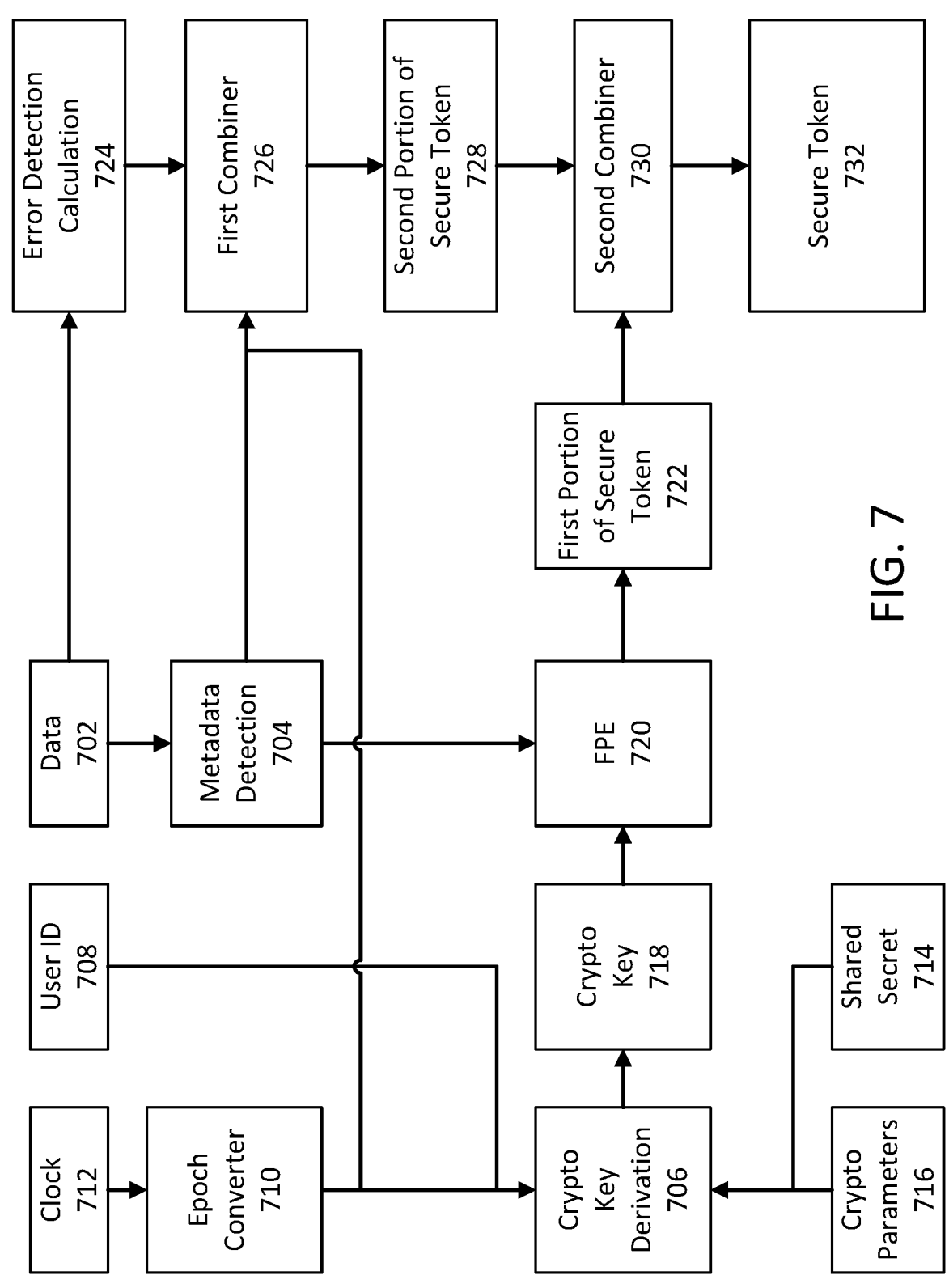
FIG. 7 shows an example of components used to implement the process depicted in FIGS. 3A and 3B in accordance with one or more aspects of the disclosure.

FIG. 7 shows a block diagram of components that may be used to implement the process 300 for tokenizing data that is to be securely shared according to one or more aspects of the disclosure. The components may be implemented in hardware, software, or any combination thereof, and may represent functional operations or functional components of a computing device used to implement the process 300 such as, for example, the first user computing device 102 or the computing device 200.

As shown in FIG. 7, data 702 may be received by a metadata detection component 704. The metadata detection component 704 receiving the data 702 may correspond to step 302 of process 300. The data 702 may be provided by a user or may be otherwise accessible to a computing device implementing the process 300. As an example, the data 702 may be "0123456789."

As additionally shown in FIG. 7, a cryptographic key derivation component 706 may receive a user ID 708. As described herein, the user ID may be an identifier of the intended recipient of secure data (e.g., the intended recipient of the secure token generated by the process 300). As additionally described herein, the user ID may be an identifier and may be any value—and is intended to be used both in the process 300 and the process 600 as inputs into a cryptographic key derivation operation. The user ID may be provided by a user directly or may be otherwise accessible to a computing device implementing the process 300.

The cryptographic key derivation component 706 may also receive a current system time from an epoch converter component 710. The epoch converter component 710 may be coupled to a system clock component 712. The system clock component 712 may provide a time reference while the epoch converter component 710 converts the time reference to a measure of an amount of time elapsed from a predetermined prior point in time.

The cryptographic key derivation component 706 may further receive a predetermined shared secret 714 and cryptographic parameters 716, which may include an indication of a number of iterations to perform for a key derivation function. The predetermined shared secret 714 and the cryptographic parameters 716 may be stored in a memory or database accessible to the computing device implementing the process 300.

As an example, the user ID may be "Alice" and the current system time may be "433031" (e.g., representing a number of hours since year X).

The cryptographic key derivation component 706 receiving the user ID, the current system time, the predetermined shared secret 714, and the cryptographic parameters 716 may correspond with step 304 of the process 300.

As further shown in FIG. 7, the cryptographic key derivation component 706 may derive a cryptographic key 718. The cryptographic key derivation component 706 may derive the cryptographic key 718 using a key derivation function and based on the user ID 708, the current system time from the epoch converter 710, the predetermined shared secret 714, and/or the cryptographic parameters 716.

The current system time from the epoch converter 710, the predetermined shared secret 714, the predetermined number of iterations specified by the cryptographic parameters 716, and the user ID 708 may represent input parameters to the key derivation function. Other input parameters to the key derivation function may include a desired length of the output. In one example, the user ID 708 and the current system time from the epoch converter 710 may form a cryptographic salt.

The key derivation algorithm may be any key derivation algorithm or protocol such as, for example, Password-Based Key Derivation Function 1 (PBKDF1) or Password-Based Key Derivation Function 2 (PBKDF2). The output of the key derivation process may be represented by cryptographic key 718.

As an example, the number of iterations specified as part of the cryptographic parameters 716 may be "65536," the cryptographic salt may be a combination of the user ID 708 "Alice," the current system time "433031" (e.g., "Alice: 433031"), and the key derivation function may be PBKDF2. Under such a scenario, the derived cryptographic key 718 may be "0x556B586E3272357538782F413F442847."

The cryptographic key derivation component 706 deriving the cryptographic key 718 may correspond to step 306 of the process 300.

As further shown in FIG. 7, the metadata detection component 704 may detect the radix and length of the data 702. The length of the data may be a count of a number of characters comprising the data. Continuing with the example of the data 702 being "0123456789," the length of the data as determined by the metadata detection component 704 may be "10." Further, the radix may be determined and expressed in any manner. As an example, the radix may comprise different possible values such as "1" for binary data, "2" for numbers or numerical data (e.g., Base10), "3" for alphabetic data, and "4" for alphanumeric data. Continuing with the example of the data 702 having a value of "0123456789," the radix of the data as determined by the metadata detection component 704 may be "2." Further, it may be determined that the data is expressed as a decimal value.

The metadata detection component 704 may also convert the data 702 to a target radix. For example, the metadata detection component 704 may determine an initial or original radix of the data 702 and may convert the data 702 to another desired radix prior to data 702 being encrypted. For example, the target radix may be determined to be Base 62. Accordingly, metadata detection component 704 may convert the data 702 from an original format to a representation based on Base 62 encoding. Continuing with the example of the data 702 being "0123456789," the target radix may be Base 62 alphanumeric such that the converted data 702 is "8m0Kx." The metadata detection component 704 detecting the length and radix of the data 702 and converting the data 702 to a target radix may correspond to step 308 of the process 300.

The data 702, after conversion to the target radix, may then be encrypted by the FPE component 720. The FPE component 720 may encrypt the data 702 (e.g., after conversion to the target radix) using the derived cryptographic key 718. As a result of encrypting the data 702, the FPE component 720 may generate a first portion of a secure token 722. As an example, for converted data "8m0Kx," the FPE component 720 may generate as output "c5tGm." Accordingly, "c5tGm" may represent the first portion of the secure token.

The FPE component 720 encrypting the data 702 may correspond to step 310 of the process 300.

As further shown in FIG. 7, an error detection calculation component 724 may perform an error detection calculation on the data 702 to generate error detection data. As an example, the error detection calculation may be based on a checksum or cyclic redundancy check (CRC) algorithm and the error detection data generated may be checksum data or CRC-16 data. In another example, the error detection calculation may be a message authentication code (MAC), such as a hash-based message authentication code (HMAC). Continuing with the example data of "0123456789," the error detection calculation may be a CRC-16 calculation that generates error detection data "0x443D." The error detection calculation component 724 performing the error detection calculation on the data 702 may correspond to step 312 of the process 300.

The error detection data generated by the error detection calculation component 724, the current system time provided by the epoch converter 710, and the metadata (e.g., the length and radix of the data 702) detected by the metadata detection component 704 may be provided to first combiner component 726. The first combiner component 726 may combine the error detection data generated by the error detection calculation component 724, the current system time provided by the epoch converter 710, and/or the metadata (e.g., the length and radix of the data 702) detected by the metadata detection component 704 in any manner.

Further, the combination of these elements may be converted to a predetermined length string of a target radix by the first combiner component 726. As an example, the combined elements may comprise 48 bits of information that is converted to an alphanumeric string of a desired size. As an example, the error detection data may be "0x443D," the radix may be "2," the length may be "10," and the current system time may be "433031". The error detection data "0x443D" may be represented by a 16 bit binary value. The radix "2" may be represented by a 4 bit binary value. The length "10" may be represented by an 8 bit binary value. The current system time "433031" may be represented by a 20 bit binary value. Combined, these elements may form a 48 bit or 6 byte number that is converted to Base 62. For these example values, the result of the conversion may be "0liVScFoP."

The output of the first combiner component 726 may represent a second portion of the secure token 708. Accordingly, based on the example described immediately above, the second portion of the token 726 may be "0liVScFoP."

The combination of the error detection data, the current system time provided by the epoch converter 710, and the metadata (e.g., the length and radix of the data 702) and conversion of these elements to a target radix by the first combiner component 726 may be correspond to steps 314 and 316 of the process 300.

As further shown in FIG. 7, the first portion of the secure token 722 and the second portion of the secure token 728 may be provided to the second combiner component 730. The second combiner component 730 may combine the first portion of the secure token 722 and the second portion of the secure token 728 in any manner to form the secure token 732 (e.g., by concatenation, by interleaving, in accordance with a bitmap or other designated bit pattern, etc.). The combining of the first portion of the secure token 722 and the second portion of the secure token 728 by the second combiner component 730 may correspond to step 318 of the process 300.

The secure token 732 may then be sent to another computing device (e.g., the second user computing device 104). Sending the secure token 732 to another computing device may correspond to step 320 of the process 300.

As an example, the second combiner component 730 may combine the first portion of the secure token 722 and the second portion of the secure token 728 by concatenation. For example, the first portion of the secure token 722 "c5tGm" and the second portion of the secure token 728 "0liVScFoP" may be combined by appending the second portion of the secure token 728 to the first portion of the secure token 722—to form the secure token 732 as "e5tGm0liVScFoP."

As another example, the second combiner component 730 may combine the first portion of the secure token 722 and the second portion of the secure token 728 by interleaving in accordance with a predetermined interleaving pattern. For example, the first portion of the secure token 722 "c5tGm" and the second portion of the secure token 728 "0liVScFoP" may be combined by interleaving—to form the secure token 732 as "c05litVSGcFmoP" (e.g., such that the second portion of the secure toke 728 is shown in underline within the complete secure token 732 as "c05litVSGcFmoP").

Discussion will now turn to functional components and operations for implementing the process of 600, while including an example of actual data recovered from a secure token based on the example data used in relation to the discussion of FIG. 7.

Figure 8:
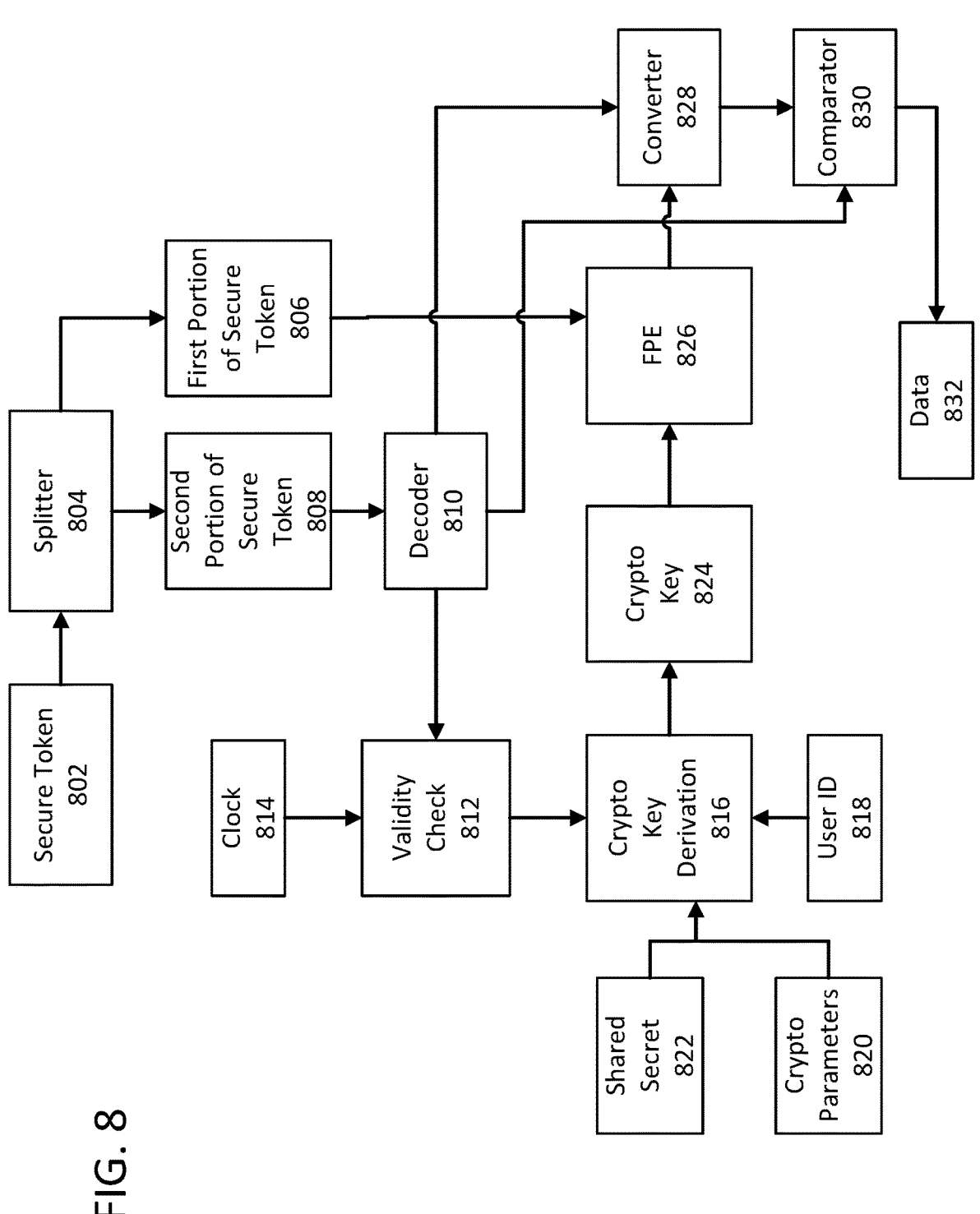
FIG. 8 shows an example of components used to implement the process depicted in FIGS. 6A and 6B in accordance with one or more aspects of the disclosure.

FIG. 8 shows a block diagram of components that may be used to implement the process 600 for detokenizing data to enable secure data to be shared according to one or more aspects of the disclosure. The components may be implemented in hardware, software, or any combination thereof, and may represent functional operations or functional components of a computing device used to implement the process 600 such as, for example, the second user computing device 104 or the computing device 200.

As shown in FIG. 8, a secure token 802 may be received by a decoupling component 804. The decoupling component 804 may decouple or may split the secure token 802 into a first portion 806 and a second portion 808. The decoupling component 804 may be considered to be a splitter. The first portion of the secure token 802 and the second portion of the secure token 808 may be combined in any manner (e.g., by concatenation or interleaving), as described in step 318 of process 300. The decoupling component 804 may be aware of the manner in which the first portion of the secure token 806 and the second portion of the secure token 808 may be combined; therefore, the decoupling component 804 may perform one or more operations to separate the first portion of the secure token 806 and the second portion of the secure token 808 in view of the known manner of combining (e.g., by deconcatenating or deinterleaving the first portion of the secure token 806 and the second portion of the secure token 808).

As an example, the secure token 806 may match the secure token 732—such that the first portion of the secure token 806 may be "e5tGm" and the second portion of the secure token 808 may be "0liVScFoP," and the secure token 802 may be formed by concatenating the first portion of the secure token 806 "e5tGm" and the second portion of the secure token 808 "0liVScFoP to form the secure token 802 ""e5tGm0liVScFoP." As such, the decoupling component may decouple or split the secure token 802 into the corresponding first portion 806 and second portion 808.

As another example, the secure token 802 may be formed by interleaving the first portion of the secure token 806 "e5tGm" and the second portion of the secure token 808 "0liVScFoP to form the secure token 802 as "e05litVSGcFmoP." As such, the decoupling component may decouple or split the secure token 802 into the corresponding first portion 806 and second portion 808.

Decoupling the secure token 802 into the first portion of the secure token 806 and the second portion of the secure token 808 by the decoupling component 804 may correspond to steps 602 and/or 604 of the process 600.

As further shown in FIG. 8, the second portion of the secure token 808 may be provided to decoder 810. The decoder 810 may decode the secure token 802 to recover a recovered current system time, recovered metadata (e.g., recovered data indicating a radix and a length of the encrypted data of the secure token 802), and recovered error detection data. The second portion of the secure token 808 may be decoded by the decoder component 810 by converting the second portion of the secure token 808 from a predetermined length string of a target radix back to an initial radix.

As an example, the second portion of the secure token 808 may be encoded according to Base 62 encoding, and may be decoded to form a representation of the second portion of the secure token 808 as a binary sequence or other numerical value. As described, the decoded second portion of the secure token 808 may comprise recovered error detection data, a recovered current system time, a recovered length of the data, and a recovered radix of the data. These components of the decoded second portion of the secure token 808 may be extracted and stored.

Decoding the second portion of the secure token by the decoder component 810 may correspond to step 606 of the process 600.

The recovered current system time may be provided to a token validity check component 812. The token validity check component 812 may determine whether the secure token 802 is expired (e.g., invalid) or unexpired (e.g., valid). The secure token 802 may be valid for a predetermined amount of time. The recovered current system time may represent a first time from which the secure token 802 is valid. The secure token 802 may be valid, for example, for 24 hours. Based on a comparison of the now current system time to the recovered current system time, the token validity check component 812 may determine if more or less than the predetermined amount of time (e.g., 24 hours) has elapsed.

To evaluate whether the secure token 802 is expired or unexpired, the token validity check component 812 may be coupled to a system clock component 814. The system clock component 814 may provide a current system time to the token validity check component 812. The token validity check component 812 may then use the current system time provided from the system clock component 814 to compare to the recovered current system time from the second portion of the secure token 808. The system clock component 814 may be substantially similar to the system clock component 712. The token validity check component 812 may include an epoch converter (e.g., substantially similar to the epoch converter 710) for determining the current system time as a measure of time from some predetermined point in time.

As an example, if the difference between the now current system time and the recovered current system time is less than the predetermined amount of time (e.g., 24 hours), as determined by the token validity check component 812, then the token validity check component 812 may determine that the secure token 802 is unexpired and therefore valid. For example, the recovered current system time may be determined to be "433031" and the current system time provided by an epoch converter of the token validity check component 812 may be "433054." The token validity check component 812 may then determine that the secure token 802 is still valid as unexpired, as the difference between the recovered current system time and the current system time is less than the predetermined amount of time (e.g., 24 hours).

As another example, if the difference between the now current system time and the recovered current system time is greater than the predetermined amount of time (e.g., 24 hours), as determined by the token validity check component 812, then the token validity check component 812 may determine that the secure token 802 is expired and therefore invalid. For example, the recovered current system time may be determined to be "433031" and the current system time provided by an epoch converter of the token validity check component 812 may be "433751." The token validity check component 812 may then determine that the secure token 802 is not valid as expired, as the difference between the recovered current system time and the current system time is greater than the predetermined amount of time (e.g., 24 hours). The token validity check component 812 may output an indication indicating that the secure token 802 is expired and may no longer be valid.

Checking whether the secure token 802 is expired or not by the token validity check component 812 may correspond to steps 608 and/or 610 of the process 600.

As further shown in FIG. 8, a cryptographic key derivation component 816 may receive a user ID 818, cryptographic parameters 820 (including an indication of a number of iterations to perform for a key derivation function), and predetermined shared secret 822. The user ID 818 may be the user ID of the intended recipient. For example, the user ID 818 may be "Alice," matching the user ID used to generate the secure token 802. The cryptographic key derivation component 816 may also receive the recovered current system time from the token validity check component 814.

The cryptographic key derivation component 816 may be substantially similar to the cryptographic key derivation component 706. The user ID 818 may be the same identifier as the user ID 708. The predetermined shared secret 822 may be the same as the predetermined shared secret 714. The cryptographic parameters 820 may specify the same parameters and corresponding values as the cryptographic parameters 716.

The cryptographic key derivation component 816 receiving the user ID 818, the cryptographic parameters 820, the predetermined shared secret 822, and the recovered current system time may correspond to step 612 of the process 600.

The cryptographic key derivation component 816 may use a key derivation function to generate a cryptographic key 820. The cryptographic key may be generated based on the user ID 818, the cryptographic parameters 820, the predetermined shared secret 822, and the recovered current system time. The key derivation function may be any key derivation function including, for example, the PBKDF2 key derivation function. The cryptographic key derivation component 816 may use the same key derivation function as the cryptographic key derivation component 706.

As an example, the user ID 818 "Alice" and the recovered current system time "433031" may form a cryptographic salt. The user ID 818 and the recovered current system time may be combined in any manner to form the cryptographic salt. For example, the user ID 818 and the recovered current system time may be concatenated to form the cryptographic salt.

The cryptographic key 820 derived by the cryptographic key derivation component 816 may match the cryptographic key 718 derived by the cryptographic key derivation component 706, as intended. For example, the cryptographic key 820 derived by the cryptographic key derivation component 816 may match the cryptographic key 718 derived by the cryptographic key derivation component 706 when (a) the recovered current system time provided by the decoder component 810 matches the current system time provided by the epoch converter 710 (e.g., "433031"), when the cryptographic parameters 820 matches the cryptographic parameters 716, including specification of the same number of iterations (e.g., "65536"), and when the predetermined shared secret 822 matches the predetermined shared secret 714. As a particular example, based on the example values described herein, the cryptographic key 824 may be derived to be "0x556B586E3272357538782F413F442847."

A different, non-matching cryptographic key 824 may be derived when any of the input parameters to the cryptographic key derivation component 816 do not match the input parameters to the cryptographic key derivation component 706. For example, if the user ID 808 is "Bob" instead of "Alice," then the cryptographic salt provided to the cryptographic key derivation component 816 will be "Bob: 433031" instead of "Alice: 433031," resulting in an entirely different cryptographic key 824 being derived. In turn, the encrypted data of the secure token 802 will not be properly or accurately recovered to match the data 702.

Derivation of the cryptographic key 820 by the cryptographic key derivation component 816 may correspond to step 614 of the process 600.

As further shown in FIG. 8, an FPE component 826 may receive the cryptographic key 820 and the first portion of the secure token 806. The FPE component 822 may decrypt the first portion of the secure token 806 using the cryptographic key 820. As a result of decrypting the first portion of the secure token 806, recovered data may be obtained. As an example, the first portion of the secure token 808 may be "e5tGm" which is decrypted by the FPE component 826 to "8m0Kx."

Decrypting the first portion of the secure token 806 may correspond to step 616 of the process 600.

The recovered data may be provided to a converter component 828. The converter component 828 may also receive information regarding the radix and length of the data encrypted by the secure token 802 from the decoder component 810. The converter component 810 may convert the recovered data from a first format to a second format. The first format may be the target radix determined in step 308, and the second format may correspond to the format of the data prior to being converted to the target radix in step 308. As an example, the recovered data may be encoded according to Base 62 (e.g., the first format), and the recovered data may be converted to a decimal value.

The recovered length of the data may also be used to determine if the recovered data in the second format should be padded. That is, when converting the recovered data to the second format, the recovered length of the data determined by the decoder component 810 may inform whether and how much zero-padding should be performed on the recovered data to ensure the length of the recovered data matches the length of the original data encrypted by the first computing device.

As an example, the decoder component 810 may provide an indication of a radix of the encrypted data, which may be "2," to indicate that the second format of the recovered data should be expressed as a numerical value. Further, the decoder component 810 may provide an indication of a length of the encrypted data, which may be "10," to indicate that the second format of the recovered data should be expressed using 10 characters. Together, the radix and length information may be used to determine that the converted recovered data should be expressed as a 10 digit numerical value.

Continuing with the example, the converter component 828 may convert the decrypted second portion of the secure token 802 "8m0Kx" to "123456789," which is then padded to form "0123456789," given the known length of the converted recovered data.

Converting the recovered data outputted by the FPE component 826 to the second format may represent step 618 of process 600.

As further shown in FIG. 8, the converted recovered data from the converter component 828 may be provided to an error detection calculation and comparator component 830. The error detection calculation and comparator component 830 may perform an error calculation on the converted recovered data "0123456789" as described herein.

As an example, the error detection calculation and comparator component 830 may perform a CRC-16 calculation on the converted recovered data "0123456789" to generate a checksum of "0x443D." Performing the error detection calculation on the converted recovered data by the error detection calculation and comparator component 830 may correspond to step 620 of the process 600. The error detection calculation data generated by the error detection calculation and comparator component 830 may be considered to be confirmation error detection calculation data.

After generating the checksum of "0x443D," the error detection calculation and comparator component 830 may compare the recovered error detection data from the decoder component 810 to the calculated checksum to determine the validity of the converted recovered data. As an example, the recovered error detection calculation data from the decoder component 810 may also be "0x443D," and the error detection calculation and comparator component 830 may determine that the converted recovered data is accurate or correct. As such, the error detection calculation and comparator component 830 may output an indication that the converted recovered data is accurate or correct.

Alternatively, if the recovered error detection calculation data from the decoder component 810 differs from "0x443D," then the error detection calculation and comparator component 830 may determine that the converted recovered data is inaccurate or not correct. As such, the error detection calculation and comparator component 830 may output an indication that the converted recovered data is inaccurate or not correct.

Comparing the recovered error detection calculation data from the decoder component 810 to error detection calculation data determined by the error detection calculation and comparator component 830 may correspond to steps 622, 624, and/or 626 of process 600.

Assuming a match between the error calculation data, the recovered data provided to the error detection calculation and comparator component 830—"0123456789"—may then be used by the second user associated with the second computing device, and the second user may feel confident the recovered data is accurate and was not comprised. The recovered data may be outputted by the comparator component 830. The recovered data is shown in FIG. 8 as recovered output data 832.

Any of the components shown or described in relation to FIGS. 7 and 8 may be combined with any other component described or shown in FIGS. 7 and 8, respectively.

The above-described systems, devices, and methods may improve the security of plaintext data stored in a memory. In particular, the techniques described herein may prevent the recovery of data via scanning memory dumps, scanning core dump files, cold boot attacks, and the like. These techniques can be accomplished without adding significant delay when data is requested.

One or more features discussed herein may be embodied in computer-usable or readable data and/or computer-executable instructions, such as in one or more program modules, executed by one or more computers or other devices as described herein. Program modules may comprise routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more features discussed herein, and such data structures are contemplated within the scope of computer executable instructions and computer-usable data described herein. Various features described herein may be embodied as a method, a computing device, a system, and/or a computer program product.

Although the present disclosure has been described in terms of various examples, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present disclosure may be practiced otherwise than specifically described without departing from the scope and spirit of the present disclosure. Although examples are described above, features and/or steps of those examples may be combined, divided, omitted, rearranged, revised, and/or augmented in any desired manner. Thus, the present disclosure should be considered in all respects as illustrative and not restrictive. Accordingly, the scope of the disclosure should be determined not by the examples, but by the appended claims and their equivalents.

What is claimed is:

1. A method comprising:
   receiving, at a first computing device and from a second computing device, a secure token;
   decoding, at the first computing device, a first portion of the secure token to recover metadata and error detection data;
   determining, based on the metadata, a recovered system time;

determining, based on a current system time and the recovered system time, whether the secure token is unexpired;
   decrypting, according to a format-preserving encryption algorithm, based on a user identification, and using a cryptographic key, a second portion of the secure token to generate recovered data;
   performing, based on the recovered data, an error detection calculation on the recovered data to generate confirmation error detection data;
   determining, based on comparing the error detection data and the confirmation error detection data, whether the secure token is valid;
   outputting, by the first computing device, an indication of a result of determining whether the secure token is valid; and
   outputting, by the first computing device, the recovered data.

2. The method of claim 1, further comprising decoupling the first portion of the secure token and the second portion of the secure token.

3. The method of claim 2, wherein decoupling the first portion of the secure token and the second portion of the secure token comprises deinterleaving the first portion of the secure token and the second portion of the secure token.

4. The method of claim 2, wherein decoupling the first portion of the secure token and the second portion of the secure token comprises deconcatenating the first portion of the secure token and the second portion of the secure token.

5. The method of claim 1, wherein the current system time is determined using an epoch converter.

6. The method of claim 1, wherein the current system time comprises a value indicating an amount of time elapsed from a predetermined prior time.

7. The method of claim 1, wherein determining whether the secure token is unexpired further comprises comparing the recovered system time to the current system time.

8. The method of claim 1, further comprising:
   deriving the cryptographic key, using a key derivation function and based on the recovered system time, a predetermined shared secret associated with the first computing device and the second computing device, a predetermined number of iterations associated with the key derivation function, and the user identification.

9. The method of claim 1, wherein the user identification comprises an identifier associated with an intended recipient of data of the secure token.

10. The method of claim 1, wherein performing the error detection calculation on the recovered data to generate the confirmation error detection data comprises performing a cyclic redundancy check (CRC) on the recovered data.

11. A computing device comprising:
   one or more processors; and
   memory storing instructions that, when executed by the one or more processors, cause the computing device to:
      receive, at the computing device and from a remote computing device, a secure token;
      decode, at the computing device, a first portion of the secure token to recover metadata and error detection data;
      determine, based on the metadata, a recovered system time;
      determine, based on a current system time and the recovered system time, whether the secure token is unexpired;
      decrypt, according to a format-preserving encryption algorithm, based on a user identification, and using a cryptographic key, a second portion of the secure token to generate recovered data;

perform, based on the recovered data, an error detection calculation on the recovered data to generate confirmation error detection data;

determine, based on comparing the error detection data and the confirmation error detection data, whether the secure token is valid;

output, by the computing device, an indication of a result of determining whether the secure token is valid; and output, by the computing device, the recovered data.

12. The computing device of claim 11, wherein the current system time is determined using an epoch converter.

13. The computing device of claim 11, wherein the current system time comprises a value indicating an amount of time elapsed from a predetermined prior time.

14. The computing device of claim 11, wherein the instructions, when executed by the one or more processors, cause the computing device to determine whether the secure token is unexpired by comparing the recovered system time to the current system time.

15. The computing device of claim 11, wherein the instructions, when executed by the one or more processors, cause the computing device to:

derive the cryptographic key, using a key derivation function and based on the recovered system time, a predetermined shared secret associated with the computing device and the remote computing device, a predetermined number of iterations associated with the key derivation function, and the user identification.

16. The computing device of claim 11, wherein the user identification comprises an identifier associated with an intended recipient of data of the secure token.

17. The computing device of claim 11, wherein the instructions, when executed by the one or more processors, cause the computing device to perform the error detection calculation on the recovered data to generate the confirmation error detection data by performing a cyclic redundancy check (CRC) on the recovered data.

18. One or more non-transitory computer-readable media storing instructions that, when executed by one or more processors, cause the one or more processors to perform steps comprising:

receive, at a first computing device and from a second computing device, a secure token;

decode, at the first computing device, a first portion of the secure token to recover metadata and error detection data;

determine, based on the metadata, a recovered system time;

determine, based on a current system time and the recovered system time, whether the secure token is unexpired;

decrypt, according to a format-preserving encryption algorithm, based on a user identification, and using a cryptographic key, a second portion of the secure token to generate recovered data;

perform, based on the recovered data, an error detection calculation on the recovered data to generate confirmation error detection data;

determine, based on comparing the error detection data and the confirmation error detection data, whether the secure token is valid;

output, by the first computing device, an indication of a result of determining whether the secure token is valid; and output, by the first computing device, the recovered data.

19. The one or more non-transitory computer-readable media of claim 18, wherein the instructions, when executed by the one or more processors, cause the first computing device to:

derive the cryptographic key, using a key derivation function and based on the recovered system time, a predetermined shared secret associated with the first computing device and the second computing device, a predetermined number of iterations associated with the key derivation function, and the user identification.

20. The one or more non-transitory computer-readable media of claim 18, wherein the user identification comprises an identifier associated with an intended recipient of data of the secure token.

* * * * *